United States Patent [19]

Heckard et al.

[11] Patent Number: 5,110,381
[45] Date of Patent: May 5, 1992

[54] ULTRASONIC WELDING WITH CONTROLLED SEAL COMPRESSION

[76] Inventors: David P. Heckard, 61566 County Rd. 133, Elkhart, Ind. 46526; Cameron B. Erekson, 23724 Cortland Dr., Elkhart, Ind. 46514

[21] Appl. No.: 541,551

[22] Filed: Jun. 21, 1990

[51] Int. Cl.$^5$ ............................................. B32B 31/00
[52] U.S. Cl. .................... 156/64; 156/73.1; 156/358; 156/359; 156/378; 156/580.1; 425/174.2; 264/23
[58] Field of Search ............ 156/73.1, 73.4, 580.1, 156/64, 274.4, 274.8, 378, 380.4, 358, 359; 264/23; 425/174.2; 228/1.1, 110

[56] References Cited

U.S. PATENT DOCUMENTS

| | | | |
|---|---|---|---|
| 4,410,381 | 10/1983 | Chapman | 156/64 |
| 4,549,269 | 10/1985 | La Pointe et al. | 364/472 |
| 4,631,685 | 12/1986 | Peter | 156/73.1 X |
| 4,696,708 | 9/1987 | Keller et al. | 156/64 |
| 4,741,796 | 5/1988 | Althaus et al. | 156/272.4 |
| 4,897,134 | 1/1990 | Doering | 156/73.1 |

Primary Examiner—David A. Simmons
Assistant Examiner—J. Sells

[57] ABSTRACT

A two stage process of ultrasonic welding is disclosed wherein a first stage determines the amount of displacement required to produce a desired compressive force upon a seal or spring. This displacement is sent to a second stage where the desired displacement is achieved through ultrasonic bonding.

In an alternative embodiment, the first stage determines the amount of displacement required to achieve non-compressive contact between the gasket (seal) and the component. This displacement is summed with an empirically determined displacement required to obtain a desired compressive force upon the gasket. The summed displacement is used as the desired displacement for the second stage.

9 Claims, 3 Drawing Sheets

ULTRASONIC WELDING WITH CONTROLLED SEAL COMPRESSION

BACKGROUND OF THE INVENTION

1. Field of the Invention

This invention pertains to the field of ultrasonic welding of plastics generally and specifically to a process for controlling compression of a seal or spring during the welding process.

2. Description of the Related Art

U.S. Pat. No. 4,631,685 to Peter, incorporated herein by reference, illustrates the prior art which applicants are aware of. Known processes for ultrasonic welding operate from dimensional stack up. Each component is dimensionally measured at the point of weld energy application and summed to other measurements to calculate a total stack up dimension of components at the intended weld site. Once the total stack up distance is calculated, a particular weld distance which has been determined through trial and error is summed with the stack up distance. This gives a calculated weld termination point.

In operation, the components are stacked together and positioned in line with the ultrasonic welding horn. The horn is caused to move towards the components with ultrasonic energy being supplied to the horn. The position of the horn is monitored by a linear position encoder. The position is compared to the earlier calculated weld termination point. Once the horn has reached the termination point, ultrasonic energy is ceased to be applied to the horn and the horn is briefly maintained in position. The weld junction is allowed to set and the horn then removed in preparation for the next weld cycle. Further details of the operation may be gleaned from the Peter disclosure.

While this welding process performs satisfactorily for certain types of operations, applicants have had the task of very reliably welding together two pieces of plastic which in turn apply a compressive force at a location remote from the weld to an elastomeric gasket. While stack up calculations provide some repeatability, unfortunately several variables are introduced which can not be determined based upon stack up measurements alone.

From lot to lot and even within lots, elastomeric gaskets vary in distance of compression required to produce a given compressive force. The reliability of a seal is dependent upon the compressive force applied to the seal, not the distance of compression. For example, if too great a compressive force is applied to the seal, relative motion between the parts being sealed results in greatly accelerated wear to the gasket. Where too light a force is applied, certain changes such as temperature variations which affect each of the components differently may result in a reduction of sealing force below that which would be required for liquid or vapor permeation of the seal.

Additionally, and similar to the elastomeric gaskets, from lot to lot and within lots the parts which are to be welded together have varying shapes and dimensions. The variations in shape are a direct consequence of the plastic molding operation used to form the parts. Some parts may exhibit much greater curvature from edge to center than others and there will likely be variances in thickness at particular points along the plastics depending upon shrinkage variations within the plastic during cooling after molding.

A measurement of stack up at the weld point does not identify dimensional variations which must be compensated for in order to provide a predictable sealing compression. Further, strictly dimensional measurements do not anticipate the variation of thickness between the weld location and the location of gasket compression which will result in different forces being transmitted to the gasket location from the weld site for a given identical horn displacement.

SUMMARY OF THE INVENTION

A method for ultrasonic bonding is disclosed which comprises the steps of supporting a component to be bonded in a nest, applying a force to said component along a first axis relative to said component, measuring a first displacement of a first portion of said component along said first axis at a first time, releasing said force, heating a second portion of said component by application of ultrasonic energy, measuring a second displacement of said first portion of said component along said first axis, and discontinuing said heating so as to produce a substantially permanent displacement of said first portion of said component substantially equal to said first displacement.

DESCRIPTION OF THE PREFERRED EMBODIMENT

Figure 1:
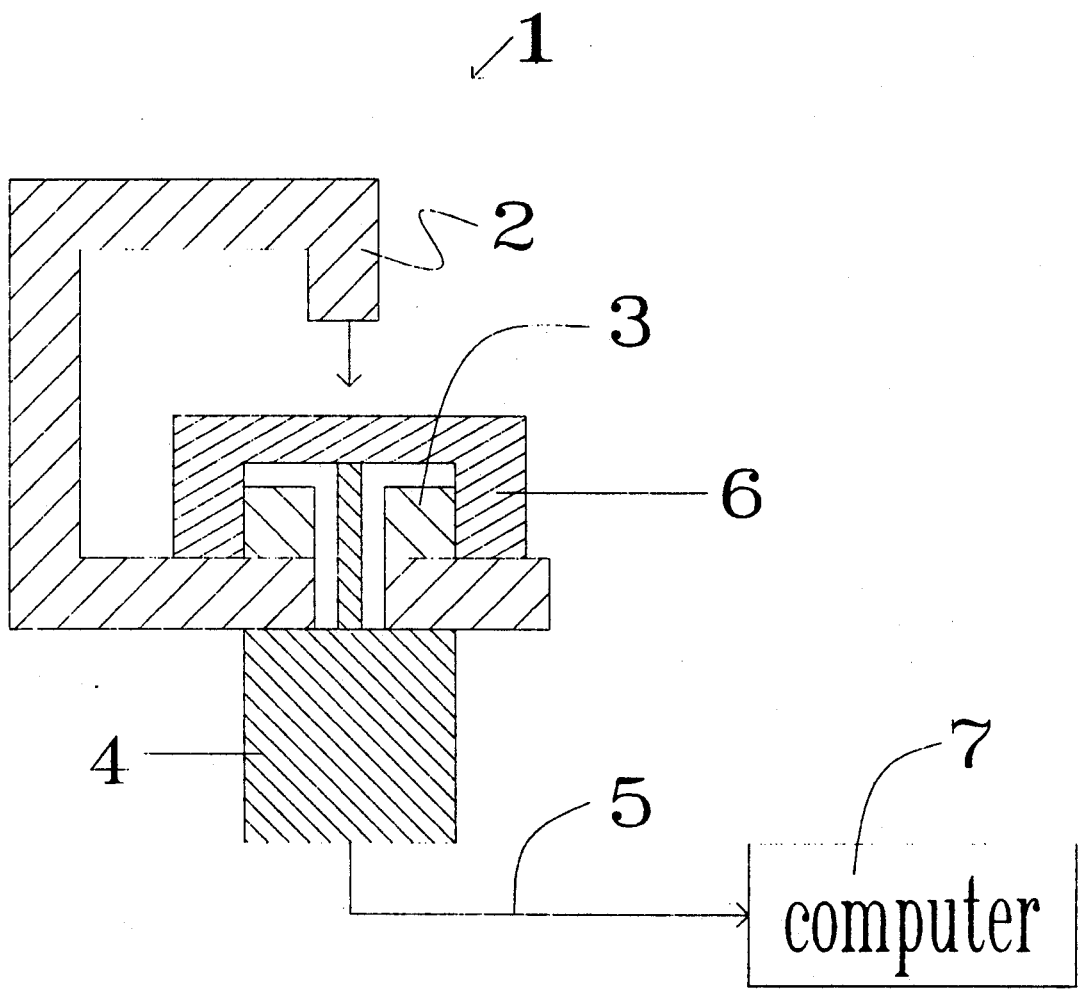
FIG. 1 illustrates a station which may be used in conjunction with the first stage of the welding process.

Referring to FIG. 1, a target displacement measuring station 1 is generally illustrated. The station includes a adjustable force application device 2, a nest 3 for holding a part 6 to be measured, and a linear encoder 4 having an output 5. For the purposes of this disclosure the encoder is presumed to contain any necessary components required to produce a digital signal adequate for interpretation by computer 7. This may be accomplished either directly through the use of a gray scale encoder or other similar digital device or alternatively by an analog sensor combined with appropriate analog to digital conversion devices. The adjustable force application device 2 may be a combination of a load sensor made by Omega Engineering Incorporated of Stamford, Conn. and a force generator comprised of a servomotor made by Aerotech Incorporated of Pittsburgh, Pennsylvania, and a precision lead screw made by Universal Thread Grinding Company of Fairfield, Conn., although other more basic designs such as a simple free weight balance could be used. The only requirement is that the adjustable force application device 2 be capable of applying a predetermined force to the part 6. In operation, the adjustable force application device 2 is caused to travel towards part 6 which is resting on nest 3. In the preferred embodiment the adjustable force application device 2 travels a sufficient distance to cause a force of predetermined magnitude to be applied to part 6. The force is measured by the adjustable force application device 2 internally. Once the predetermined force is achieved the position output 5 from the linear encoder 4 is sampled by a control computer 7 which could be an IBM AT type computer. The adjustable force application device 2 then releases in preparation for the next part to be tested. The part 6 is then transferred either mechanically or by hand to the second station illustrated in FIG. 2, although this could readily be accomplished in a single station by one skilled in the art.

Figure 2:
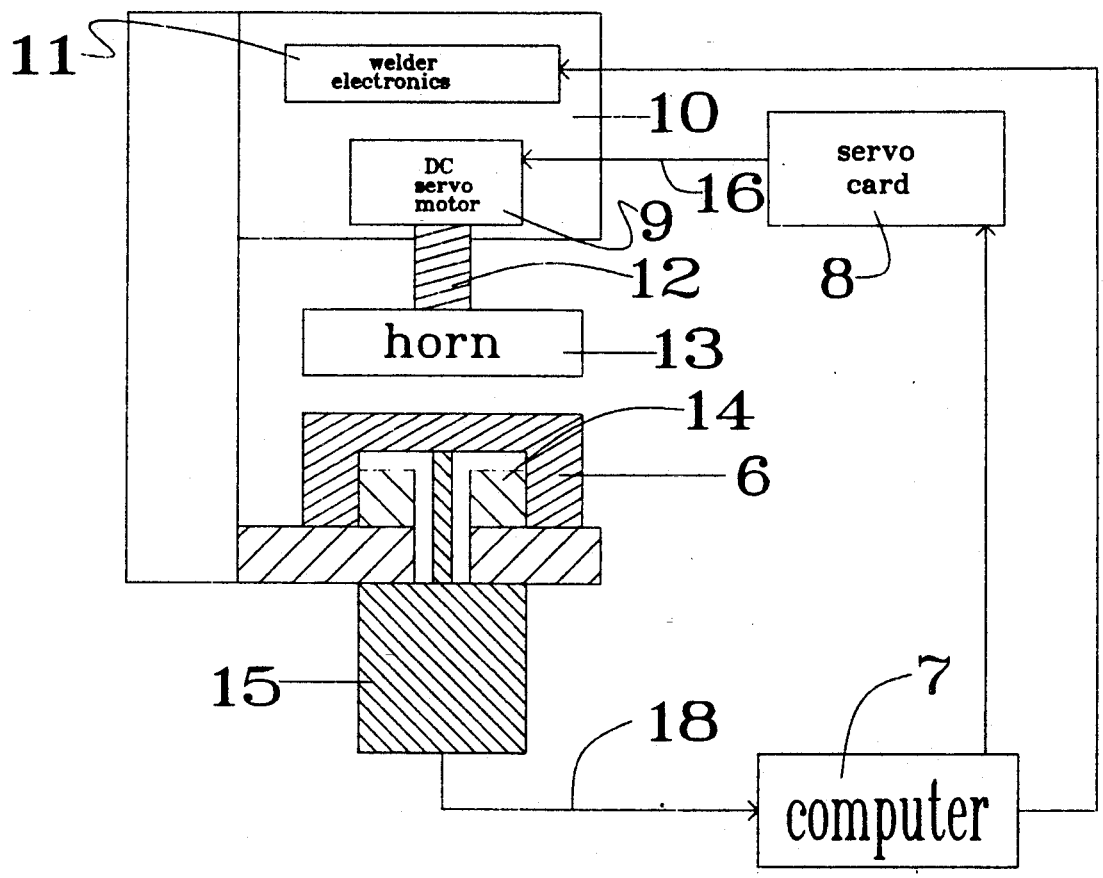
FIG. 2 illustrates a station which may be used in conjunction with the second stage of the welding process.

Referring now to FIG. 2, the position output 5 is sampled by the computer 7. Once part 6 is loaded, the system is activated either manually or, in the event part 6 is mechanically loaded, by an activation signal from a sensor. The computer generates a signal which is translated by servo card 8, which could be DMC-400-10 available from Galil Motion Control Incorporated of Palo Alto, Calif., into a control signal 16 which is used to control DC servo motor 9. When DC servo motor 9 is activated, lead screw 12 is caused to rotate moving horn 13 towards nest 14 which holds part 6. Simultaneously, the computer forwards a control signal to the welder electronics 11 and through line 17 energizes horn 13 with ultrasonic energy. The horn 13 and welder electronics 11 are available for example from Branson Ultrasonics Corporation of Danbury, Conn. As horn 13 moves toward nest 14, eventually linear encoder 15 will be displaced. Computer 7 samples the output from linear encoder 15 through line 18 and when linear encoder indicates a position has been achieved which matches the position earlier determined from output line 5, the computer forwards a signal to the welder electronics which results in a de-energization of horn 13. The welder is briefly maintained in this position to allow the weld to harden and then the lead screw is rotated so as to remove horn 13 from contact with part 6. Part 6 may now be removed from nest 14 and forwarded on for any additional processing which may be required for the application. The ultrasonic welding process according to the preferred embodiment is now complete.

While the foregoing illustrates the use of a DC servomotor for generation of motion of the horn 13, other well known methods in the prior art such as pneumatic systems or hydraulic systems are contemplated and incorporated herein. One example of a suitable system is disclosed by Peter in U.S. Pat. No. 4,631,685 discussed hereinabove. The Peter system would replace components 9,10,11,12,13, and 17. There are advantages to be gained using a pneumatic system which will be known to those skilled in the art. Additionally, all components for a pneumatic system are available for example through Branson Ultrasonics Corporation earlier mentioned.

In an alternative embodiment, the target displacement measuring station 1 illustrated in FIG. 1 may be activated so as to only apply a force which causes all parts to come into contact without compressing the sealing gasket. For the part 6 which will be discussed in detail hereinbelow in reference to FIG. 3, the force required for flexure of the cover is significantly less than the force required for flexure of the cover and simultaneous compression of the sealing gasket. Therefore, the adjustable force application device may be programmed for a magnitude of force which is less than would be required for compression of the sealing gasket while still being of greater magnitude than that which would be required for flexure of the cover. In this embodiment computer 7 adds an incremental distance to the position indicated by output line 5 so as to produce a certain distance of compression of the sealing gasket during welding.

Figure 3:
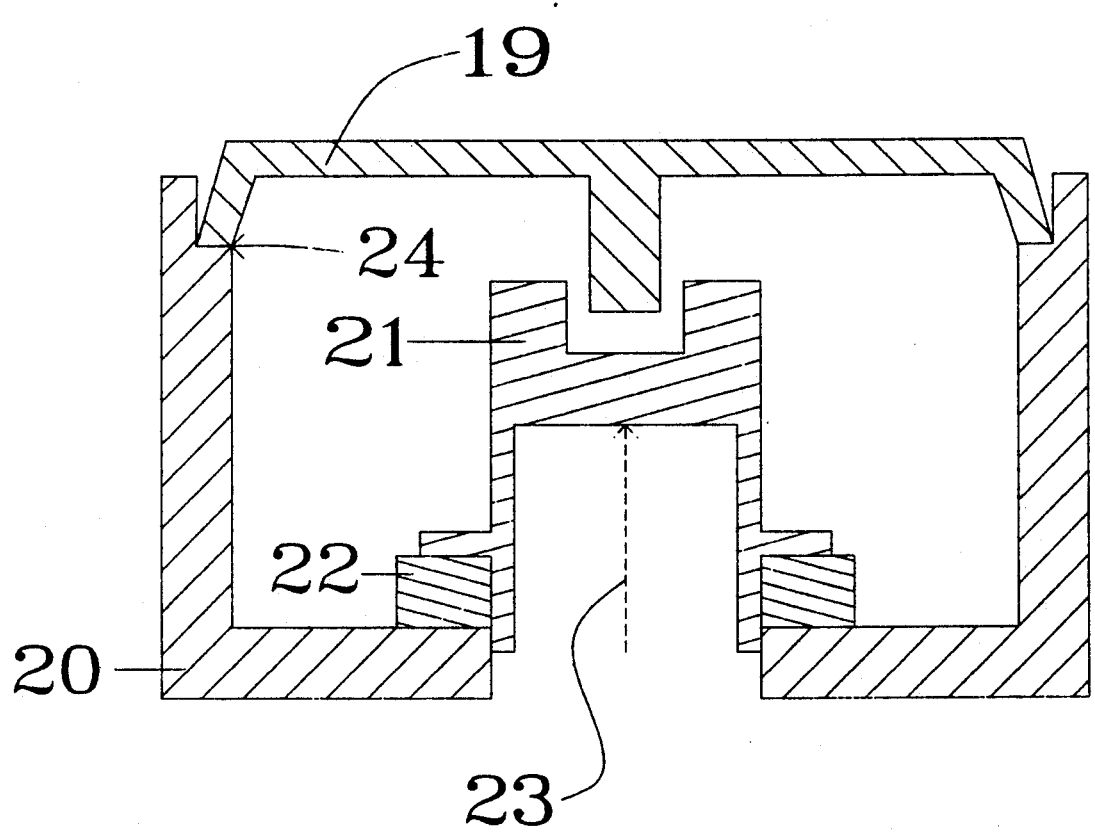
FIG. 3 illustrates a component which may be welded using the welding process.

Referring now to FIG. 3 a cross sectional view of part 6 is illustrated. While the part may take any configuration which would be appropriate for operation of this invention, this figure is provided for an illustration of one industrial application of the invention and also serves to illustrate the test part configuration used to arrive at the comparison values detailed in table 1. The part 6 has a cover 19, a base 20, rotor 21 and sealing gasket 22. In operation, part 6 is sealed by an ultrasonic weld 24 between cover 19 and base 20. Additionally, cover 19 and base 20 are deformed under stress sufficiently to apply a compressive force to sealing gasket 22 through rotor 21 so as to enact a water tight seal therebetween. In operation, the part 6 is attached through rotor 21 to a rotating shaft (not illustrated) which spins rotor 21 relative to cover 19 and base 20. The shaft is on an axis which is parallel to arrow 23. Conveniently, this provides an access to rotor 21 during manufacture wherein the linear encoders 4 and 15 may contact rotor 21 to measure linear displacement. During welding, cover 19 is forced closer to arrow 23 by a displacement of material at weld 24. This results in compression of gasket 22, creating the necessary hermetic seal for the entire package while still enabling rotation of rotor 21.

EXAMPLE

Using the welding operation similar to that disclosed by Peter in U.S. Pat. No. 4,631,685 discussed hereinabove on a standard part manufactured by the present assignee, the finished stack up heights which relate to seal compression may vary within a range of 0.030". Using the system of the preferred embodiment, the variations are reduced to a range of 0.005".

CONCLUSION

While the foregoing details what is felt to be the preferred embodiment of the invention, no material limitations to the scope of the claimed invention is intended. Examples for application of the invention include the preferred embodiment and additionally include control of forces created during a welding process to limit the range of motion of a shaft in an axial direction. In such an instance, the various components intrinsically deform to produce the desired effect accomplished in the preferred embodiment by the gasket. Further, features and design alternatives which would be obvious to one of ordinary skill in the art are considered to be incorporated herein. Previously discussed was the use of pneumatic systems such as disclosed by Peter and sold by numerous vendors. The actual scope of the invention is set forth and particularly described in the claims hereinbelow.

We claim:

1. A method for ultrasonic bonding comprising the steps of:
    supporting a component to be bonded in a nest;
    applying a first force to said component along a first axis relative to said component at a first time;
    measuring a first displacement of a first portion of said component along said first axis at said first time;
    releasing said force;
    heating a second portion of said component by application of ultrasonic energy;
    measuring a second displacement of said first portion of said component along said first axis during said application of said ultrasonic energy; and discontinuing said heating so as to produce a substantially permanent displacement of said first portion of said component substantially equal to said first displacement.

2. The method of ultrasonic bonding of claim 1 wherein the step of applying a force comprises the steps of:
applying a force having a first magnitude at a second time;
discontinuing application of said force after said magnitude reaches a predetermined level.

3. The method of ultrasonic bonding of claim 2 wherein said first time immediately precedes said step of discontinuing application of said force.

4. A method for ultrasonic bonding comprising the steps of:
supporting a component to be bonded in a nest;
applying a force to said component along a first axis relative to said component, said force being of magnitude insufficient to significantly deform a third portion;
measuring a first displacement of a first portion of said component along said first axis;
releasing said force;
heating a second portion of said component by application of ultrasonic energy;
measuring a second displacement of said first protion of said component along said first axis;
discontinuing said heating so as to produce a substantially permanent displacement of said first portion of said component substantially equal to said first displacement summed with an empirically derived additional displacement.

5. A method of generating controlled seal compression of a relatively resilient seal in conjunction with an ultrasonic welding operation comprising the steps of:
applying a first force to a first deformable region;
measuring a first displacement of said first region while said force is being applied;
calculating a target displacement based upon said first displacement, said target displacement sufficient to displace said first deformable region substantially equal to or greater than said first displacement;
applying a second force and ultrasonic energy to a second region;
measuring a second displacement while applying said second force and said energy;
discontinuing application of said energy when said second displacement reaches a magnitude equal to said target displacement.

6. The method of claim 5 wherein said first deformable region comprises said seal.

7. The method of claim 5 wherein said measuring said second displacement comprises measuring displacement of said first region.

8. The method of claim 5 wherein said step of applying a first force comprises the steps of:
contacting said first deformable region with a force applicator; and
applying a force of magnitude sufficient to deform said deformable region but of insufficient magnitude to compress said relatively resilient seal.

9. The method of claim 5 wherein said step of applying a first force comprises the steps of:
contacting said first deformable region with a force applicator; and
applying a force of magnitude sufficient to compress said relatively resilient seal.

* * * * *